March 5, 1929.  T. C. RATHBONE  1,704,341
BALANCING MACHINE
Filed July 7, 1924

WITNESSES:

T. C. Rathbone
INVENTOR

BY
ATTORNEY

Patented Mar. 5, 1929.

1,704,341

UNITED STATES PATENT OFFICE.

THOMAS C. RATHBONE, OF RIDLEY PARK, PENNSYLVANIA, ASSIGNOR TO WESTINGHOUSE ELECTRIC & MANUFACTURING COMPANY, A CORPORATION OF PENNSYLVANIA.

BALANCING MACHINE.

Application filed July 7, 1924. Serial No. 724,688.

My invention relates to apparatus for placing a rotary body in running balance either in the shop or in the field, and has for its object the provision of apparatus of the character designated which shall be simple in construction and operation and which shall give extremely accurate results.

Figure 1:
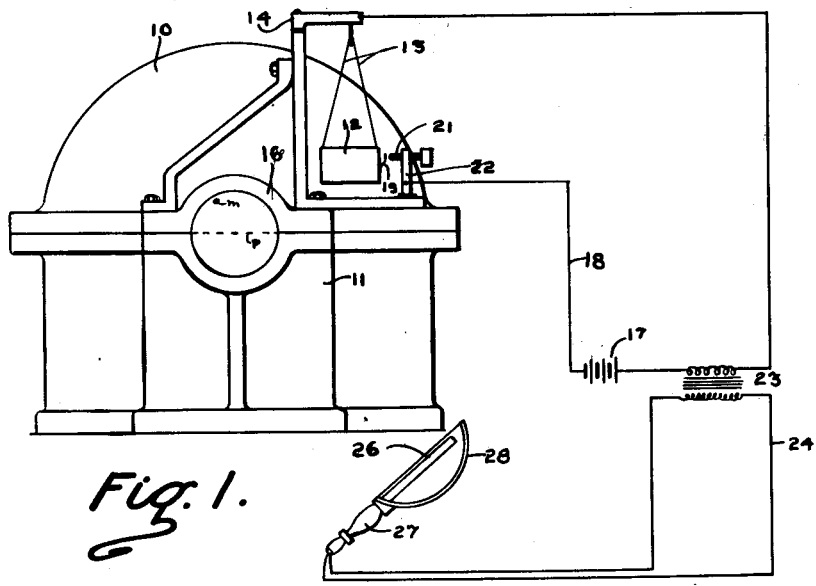
Figure 2:
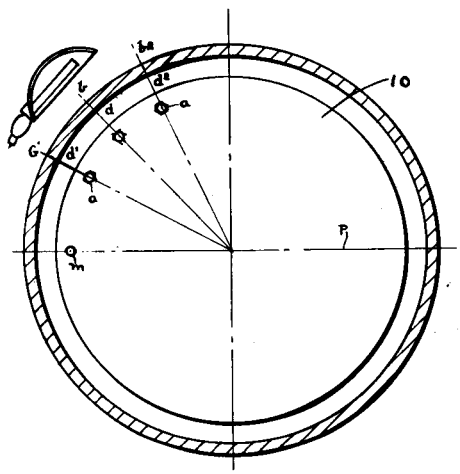
Figure 3:
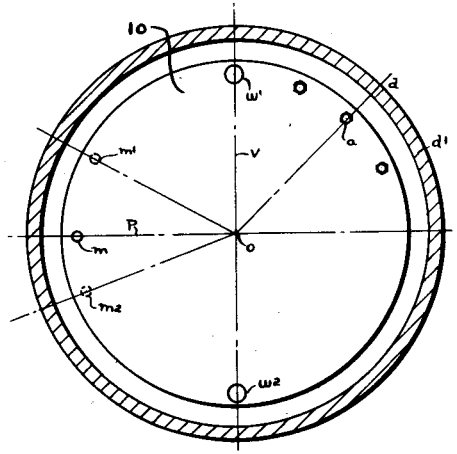

Apparatus made in accordance with my invention is illustrated in the accompanying drawings forming a part of this application in which Fig. 1 is a side elevation of the apparatus attached to a rotary body and including a diagrammatic view of the electrical circuits employed therewith; and Figs. 2 and 3 are diagrammatic views explanatory of the method of using the apparatus.

In balancing machines, as heretofore known to me, the method usually employed to determine the phase and magnitude of an unbalanced mass in a rotary body has been to first determine the amplitude of vibrations caused by the unbalanced mass in rotation at a given speed, then by the addition of arbitrary weights at selected points on the body and making further observations of the amplitude of vibrations with the weights added, to determine the location of the plane of unbalance and the magnitude of the unbalanced mass.

It has also been proposed to oppose vibrations due to the unbalanced condition of a body with other forces from without the body. This has necessitated the use of an intricate timing mechanism in order to bring the forces employed in direct opposition to the forces due to the unbalance in the body. Furthermore, the mechanism for imposing the extraneous forces upon the body and the necessity of its careful calibration, in order to give accurate results, has resulted in a complex machine which is comparatively expensive to manufacture.

In accordance with my invention, I provide an extremely simple apparatus which may be applied to a vibratory support of a rotary body either in the factory or in the field, and which immediately indicates the location of the plane of unbalance in the body. By the addition of known weights at suitable places on the body and noting the influence of the known weights upon the plane of unbalance, the magnitude of the original unbalanced mass may be readily calculated.

In employing the term "plane of unbalance" in this specification and in the claims, it should be understood that it refers specifically to that plane wherein the force due to unbalance manifests itself. This plane as is well known in the art is a variable one dependent upon the inertia of the body, the inertia of the unbalanced mass, the speed of rotation, the inertia of the supports and other disturbing factors. The angle made by the true plane of unbalance and the plane wherein the unbalanced force manifests itself, or apparent plane of unbalance is usually referred to as the "angle of lag". Knowing the apparent plane of unbalance, many methods are known to the art for determining the true plane of unbalance, any one of which may be employed.

Referring to the drawings, I show in Fig. 1 a rotatable machine 10, for example, a steam turbine, to be put in running balance. Forces due to an unbalanced condition of the body are transmitted to a bearing pedestal 11 to which may be attached my improved balancing apparatus. The forces due to unbalance in the body 10, imposed upon the bearing pedestal 11, cause it to vibrate within the plane $p$. At 12 is shown an inertia member or a massive body suspended by conducting leads 13—13 from a support 14 which is attached to a bearing cap 16. The suspending cords 13—13 are of such length as to have a relatively low frequency of vibration compared with the frequency of vibrations imposed upon the bearing pedestal 11 due to the unbalanced condition of the body being tested. As the bearing pedestal 11 vibrates with a relatively high frequency, the inertia member 12 is not vibrated thereby to an extent to cause it to affect observations being made. While I have found this a convenient method of supporting the inertia member 12 in order to maintain it at a comparatively stationary position, it will be apparent that it might be suspended or supported from any position so long as it is maintained in a comparatively fixed position relative to the rest of the apparatus.

At 17 is shown a source of electrical energy, for example a battery, and leading therefrom a circuit 18 which passes through the inertia member 12. Carried by the inertia member 12 is a contact element 19 made of some resilient material, which coacts with a contact element 21 for completing the circuit 18. The contact element 21 is carried by a support 22 attached to the support 14. The support 22 is of course insulated from the support 14. As the rotary body 10 vibrates due to its unbalanced condition, the contact element 21 serves to open and close the circuit 18 in response to vibrations of the body to be balanced. For example, if the unbalanced mass in the rotray body 10 is at $m$ as indicated in Fig. 1, when it passes through the plane $p$ at the left, the pedestal 11 is forced toward the left, taking with it the contact member 21 and completing the circuit 18. When the unbalanced mass $m$ passes through the plane $p$ at the right, the pedestal 11 is forced toward the right and the circuit 18 is opened. The contact member 21 has a threaded stem so that it may be advanced or receded with respect to the inertia member 12 and thus be so adjusted as to complete the circuit 18 at the moment the unbalanced mass $m$ passes through the plane of vibration $p$.

At 23 is shown an induction coil and at 24 a second electrical circuit for causing a discharge of electricity through an electrical discharge tube 26, such as a neon tube, upon opening and closing of the circuit 18. The discharge tube 26 is mounted upon a handle 27 so that it may be held and moved from place to place by the operator in making observations. A reflector 28 is also mounted on the handle 27 for concentrating light from the discharge tube 26 upon any desired spot.

Inasmuch as the electrical discharge tube 26 is instantaneous in its action and operates upon the opening and the closing of the circuit 18, the contact member 21 may be so adjusted that two flashes for each revolution of the body 10 occur at the discharge tube, one at "make" and the other at "break" of the primary circuit. One of the flashes occurs as the unbalanced mass $m$ approaches the plane $p$ and one as it leaves the plane $p$. I have found such an adjustment gives the more accurate result as will be more particularly pointed out hereinafter in this specification.

With the apparatus attached to the bearing cap as indicated in Fig. 1, a datum point is marked near the periphery of the rotary body and the body rotated by any desired means. The circuit 18 is then opened and closed responsive to the vibrations of the body 10 in a fixed relation to the datum point at every revolution of the body. The reflector 28 is next moved until the flashes from the discharge tube are reflected upon the datum point each time the circuit 18 is opened or closed. This makes the datum point appear to be in a fixed position instead of rotating with the body. Inasmuch as this result occurs as the unbalanced mass is passing through the plane $p$, the plane of unbalance may be immediately determined.

The above described operation may be understood by reference to Fig. 2 in which the rotary body 10 is assumed to be vibrating through the plane $p$ due to the unbalanced mass $m$. A datum point $a$, for example, a bolt head, is marked so as to render it distinguishable from other parts of the body and the contact member 21 adjusted so as to cause a flash at the discharge tube 26 as the unbalanced mass $m$ approaches and leaves the plane $p$. With the flash from the discharge tube 26 reflected upon it, the datum point $a$ appears to stand out in two positions as indicated at $d^1$ and $d^2$. While the body 10 is rotating, the operator makes two marks, $b^1$ and $b^2$, on some stationary part opposite the two apparent positions of the datum point $a$ at $d^1$ and $d^2$. The body 10 is next stopped and slowly turned until the datum point is midway between the positions $d^1$ and $d^2$ as indicated at $d$ and $b$ on the rotary and stationary parts, respectively. This point represents the true relation of the datum point $a$ to the unbalanced mass and the unbalanced mass $m$ is now in the plane $p$ at the left as shown.

Referring to Fig. 3, assume that the plane of unbalance has been found as previously outlined and that the datum point $a$, with the unbalanced mass $m$ in the plane $p$, is opposite $d$ on the stationary part. A known weight $w^1$ is next applied to the body, as shown, at a known distance $r$ from the center $o$. The body is then rotated and it is found that the datum point $a$ is apparently moved to the position shown at $d^1$, indicating that the plane of unbalance, influenced by the weight $w^1$ has moved to the position $m^1$, describing an angle $mom^1$. The weight is next placed in the position $w^2$, 180° distant from its first position and the same distance from the center $o$. Upon again rotating the body 10, the plane of unbalance is found to have moved to the positions $m^2$, determining an angle $mom^2$.

The influence over the plane of unbalance exerted by the known weight in the two positions on the body 10, 180° apart, gives a basis for a vector analysis of the forces due to unbalance by means of which the magnitude of original unbalance may be readily determined in a manner well known in the art.

From the foregoing it will be apparent that I have invented an improved balancing apparatus, simple of construction and operation, which gives an immediate indication of the plane of unbalance in a rotary body, and by means of which the magnitude of unbalance in the body may be readily determined.

While I have shown my invention in but one form, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In apparatus for determining dynamic unbalance of a vibratory body, the combination of an electrical circuit, means for periodically completing said circuit in response to vibrations of the body, illuminating means responsive to completion of the circuit, and means for concentrating rays from the illuminating means upon a given point on the vibratory body.

2. In apparatus for testing unbalance in a rotary body, the combination of means for rotatably supporting the rotary body, an inertia member associated with the body and adapted to remain in a substantially fixed position with respect thereto, an electrical circuit through the inertia member, said circuit being normally open, a contact element carried by the inertia member, a second contact element adapted to vibrate with the body, whereby the electrical circuit is periodically completed in a response to vibratory movements of said body, illuminating means responsive to completing of the circuit, and means for concentrating rays from the illuminating means upon a given point on the rotary body.

3. In apparatus for testing dynamic unbalance in a rotary body, the combination of means for rotatably supporting the rotary body, an inertia member associated with the body and adapted to remain in a substantially fixed position with respect thereto, an electrical circuit associated with the inertia member, means coacting between the inertia member and the rotary body for periodically opening and closing the electrical circuit in response to oscillations of the rotary body due to its unbalanced condition, illuminating means responsive to the opening and closing of the circuit, and means for reflecting light from the illuminating means upon a given point on the rotary body.

4. In apparatus for determining dynamic unbalance of a rotary body, the combination of a vibratory support for the rotary body, said support being adapted to support the rotary body for rotation, an inertia member associated with the vibratory support and adapted to remain in a substantially fixed position relative thereto, an electrical circuit, means coacting between the inertia member and the vibratory support for opening and closing said circuit responsive to vibrations of the support, an electrical discharge tube lighted in response to the opening and closing of the circuit, and means for reflecting light from the electrical discharge tube upon a datum point on the rotary body.

5. In apparatus for determining the phase and magnitude of unbalance in a rotary body, the combination of a support for the body, said support being adapted to support the body for rotation and to vibrate in response to periodic impulses due to unbalance of the body, an inertia member, means for flexibly supporting the inertia member, said means having a period of oscillation relatively lower than the periodic impulses of the body, a source of electrical energy, an electrical circuit from said source through the inertia member, means coacting between the inertia member and the vibratory support for opening and closing the circuit in response to the periodic impulses, and means for indicating the closing of the circuit relatively to the position of a given circumferential point on the body.

6. In apparatus for determining dynamic unbalance of a rotatable body, the combination of means for rotatably supporting the rotatable body, an electrical circuit, means for periodically opening and closing said circuit responsive to vibrations of the body, and means for indicating the time of opening and closing of said circuit relative to the angular position of a given point on the body.

7. In apparatus for determining the dynamic unbalance of a rotatable body, the combination of means for rotatably supporting the rotatable body, an inertia member, a support for the inertia member associated with the rotary body, means for suspending the inertia member from the support, said means having a period of vibration relatively lower than the rotary body, a source of electrical energy, an electrical circuit from said source through the inertia member, a contact element carried by the inertia member, a second contact element adapted to vibrate with the rotary body and coacting with the first mentioned contact element for opening and closing the electrical circuit in response to vibrations of the body, an electrical discharge tube, a circuit for producing a discharge of electricity through the discharge tube upon opening and closing of the first mentioned electrical circuit and means for reflecting light produced by the electrical discharge tube upon a given datum point on the rotary body.

8. Apparatus for determining the dynamic unbalance of a rotatable body, the combination of a vibratory support for the body, said support being adapted to support the rotatable body for rotation, an inertia member suspended from the vibratory support, an electrical circuit, contact members coacting between the vibratory support and the inertia member for opening and closing the circuit in response to vibrations of the body, an electrical discharge tube, a circuit for producing a discharge of electricity through said discharge tube upon the opening and the closing of the first mentioned circuit, and means for reflecting light from the electrical discharge tube upon a datum point on the rotary body.

In testimony whereof, I have hereunto subscribed my name this 24th day of June, 1924.

THOMAS C. RATHBONE.